United States Patent
Liu (10) Patent No.: US 10,997,580 B2
(45) Date of Patent: May 4, 2021

(54) AUTOMATICALLY DISPLAYING PAYMENT PAGES BASED ON PROXIMITY TO A PAYMENT DEVICE

(71) Applicant: Advanced New Technologies Co., Ltd., Grand Cayman (KY)

(72) Inventor: Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/433,608

(22) Filed: Jun. 6, 2019

(65) Prior Publication Data

US 2019/0311350 A1    Oct. 10, 2019

Related U.S. Application Data

(63) Continuation of application No. PCT/CN2017/113565, filed on Nov. 29, 2017.

(30) Foreign Application Priority Data

Dec. 9, 2016 (CN) .......................... 201611128026.X (51) Int. Cl.
*G06Q 20/32* (2012.01)
*G06Q 20/40* (2012.01)
(Continued)

(52) U.S. Cl.
CPC ....... *G06Q 20/3276* (2013.01); *G06Q 20/202* (2013.01); *G06Q 20/204* (2013.01);
(Continued)

(58) Field of Classification Search
None
See application file for complete search history.

(56) References Cited

U.S. PATENT DOCUMENTS

2009/0307142 A1* 12/2009 Mardikar ........... G06Q 20/1085
705/72
2012/0089471 A1*  4/2012 Comparelli ............ G06Q 20/20
705/18
(Continued)

FOREIGN PATENT DOCUMENTS

CN    102057386    5/2011
CN    103824190    5/2014
(Continued)

OTHER PUBLICATIONS

PCT International Preliminary Report on Patentability in International Application No. PCT/CN2017/113565, dated Jun. 11, 2019, 10 pages (with English Translation).
(Continued)

*Primary Examiner* — Jason Borlinghaus
(74) *Attorney, Agent, or Firm* — Fish & Richardson P.C.

(57) ABSTRACT

Techniques for displaying a payment page based on the proximity of a payment device to a client computing device are described. One example method includes receiving, at a client computing device, a signal when the client computing device is within a predetermined range of a source of the signal; determining, by the client computing device, that the signal is a predetermined characteristic signal sent by an electronic device of a payee; and in response to determining that the received signal is the predetermined characteristic signal, displaying, by the client computing device, a payment page configured to be read by the electronic device of the payee to perform an electronic payment.

15 Claims, 6 Drawing Sheets

(51) Int. Cl.
    *G06Q 20/20*        (2012.01)
    *G07G 1/00*         (2006.01)
(52) U.S. Cl.
    CPC ..... *G06Q 20/3223* (2013.01); *G06Q 20/3224* (2013.01); *G06Q 20/3227* (2013.01); *G06Q 20/3272* (2013.01); *G06Q 20/3274* (2013.01); *G06Q 20/401* (2013.01); *G07G 1/0081* (2013.01)

(56) References Cited

U.S. PATENT DOCUMENTS

| | | | |
|---|---|---|---|
| 2013/0048709 | A1 | 2/2013 | Turner |
| 2013/0197997 | A1 | 8/2013 | Ross |
| 2013/0334308 | A1* | 12/2013 | Priebatsch ............. G06Q 90/00 235/383 |
| 2014/0012689 | A1 | 1/2014 | Henderson et al. |
| 2014/0064116 | A1* | 3/2014 | Linde .................... H04L 67/06 370/252 |
| 2014/0089112 | A1 | 3/2014 | Argue et al. |
| 2014/0147122 | A1 | 5/2014 | Ahmed et al. |
| 2015/0014413 | A1 | 1/2015 | Priebatsch |
| 2016/0092880 | A1 | 3/2016 | Klingen |
| 2016/0147994 | A1 | 5/2016 | Lu |
| 2016/0210613 | A1 | 7/2016 | McGill |
| 2016/0255072 | A1 | 9/2016 | Liu |
| 2016/0358167 | A1 | 12/2016 | Van Os et al. |

FOREIGN PATENT DOCUMENTS

| | | |
|---|---|---|
| CN | 105590199 | 5/2016 |
| CN | 105844460 | 8/2016 |
| CN | 106056379 | 10/2016 |
| CN | 107038570 | 8/2017 |
| KR | 20040082000 | 9/2004 |
| KR | 20080027541 | 3/2008 |
| KR | 100845528 | 7/2008 |
| SG | 11201810903 | 1/2019 |
| WO | WO 2016186851 | 11/2016 |

OTHER PUBLICATIONS

PCT International Search Report and Written Opinion in International Application No. PCT/CN2017/113565, dated Mar. 6, 2018, 14 pages (with English Translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 17879282.6, dated Oct. 18, 2019, 7 pages.

* cited by examiner

AUTOMATICALLY DISPLAYING PAYMENT PAGES BASED ON PROXIMITY TO A PAYMENT DEVICE

CROSS-REFERENCE TO RELATED APPLICATIONS

This application is a continuation of PCT Application No. PCT/CN2017/113565, filed on Nov. 29, 2017, which claims priority to Chinese Patent Application No. 201611128026.X, filed on Dec. 9, 2016, and each application is hereby incorporated by reference in its entirety.

TECHNICAL FIELD

The present application relates to the field of information exchange technologies, and in particular, to a method, a client computing device, and an electronic device for displaying a payment page.

BACKGROUND

With the development of electronic technologies and Internet technologies, functions of electronic devices (for example, smart mobile device, smart wearable device, etc) are increasingly powerful, and a user can install application programs that have different functions on the electronic device to satisfy various application needs. For example, the user can install an application program that has a payment function to satisfy a need for quick online/offline payment.

An existing process of displaying a payment page usually includes the following: A user opens an application program that has a payment function on an electronic device, an initial page of the application program can be displayed on a display screen of the electronic device, the user taps a "Payment" button on the initial page of the application program, and the electronic device can display a payment page that has a user payment authorization code. The user payment authorization code can be a bar code and/or a two-dimensional code. The user can further provide the payment page for a payee. After obtaining the user payment authorization code on the payment page, the payee can initiate a payment request to complete payment.

The following issues can be found in existing technologies that at least the following problem exists in the existing technology: In the existing method for displaying a payment page, after opening the application program that has the payment function on the electronic device, the user needs to tap the "Payment" button on the initial page to display the payment page, and then the user provides the payment page for the payee. Because the process needs to take a certain time, a payment speed is often affected when many people wait for making a payment. In addition, the user needs to tap the "Payment" button on the initial page. Because there are usually many buttons that have different functions on the initial page, if the user fails to tap the "Payment" button when tapping, but taps another function, the user needs to exit the another function first, and then taps the "Payment" button again. As a result, the payment process takes too much time. Therefore, the existing method for displaying a payment page is not convenient enough, the payment efficiency is relatively low, and user experience is poor.

SUMMARY

An objective of implementations of the present application is to provide a method, a client computing device, and an electronic device for displaying a payment page, to improve the convenience to display a payment page and therefore improve the payment efficiency and user experience.

To alleviate the previous technical problem, the implementations of the present application provide a method, a client computing device, and an electronic device for displaying a payment page.

A method for displaying a payment page includes the following: receiving, by a client computing device, a first signal within a predetermined range; and displaying, by the client computing device, a payment page when the first signal received by the client computing device is a predetermined characteristic signal, where the payment page includes a payment authorization code.

A client computing device includes a signal receiver, a processor, and a display, where the signal receiver is configured to receive a signal within a predetermined range; the display is configured to display page data; and the processor is configured to determine whether the signal received by the signal receiver is a predetermined characteristic signal, and the processor is further configured to control the display to display a payment page if a result of the determination is yes.

An electronic device includes a signal generation apparatus and a scanning apparatus, where the signal generation apparatus is configured to send a predetermined characteristic signal; and the scanning apparatus is configured to scan a payment page of a client computing device to obtain a user authorization code of the client computing device.

It can be seen from the technical solutions provided in the implementations of the present application that, in the method, the client computing device, and the electronic device for displaying a payment page that are provided in the implementations of the present application, the electronic device can request to obtain the user authorization code from the client computing device by sending the predetermined characteristic signal; the client computing device can display the payment page that includes the user authorization code after receiving the predetermined characteristic signal sent by the electronic device; and the scanning apparatus of the electronic device can obtain the user authorization code in the payment page by sending the scanning signal for electronic payment. The electronic payment process is very convenient, so that the speed and efficiency of the electronic payment can be improved.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

Implementations of the present application provide a method, a client computing device, and an electronic device for displaying a payment page.

To make a person skilled in the art understand the technical solutions in the present application better, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
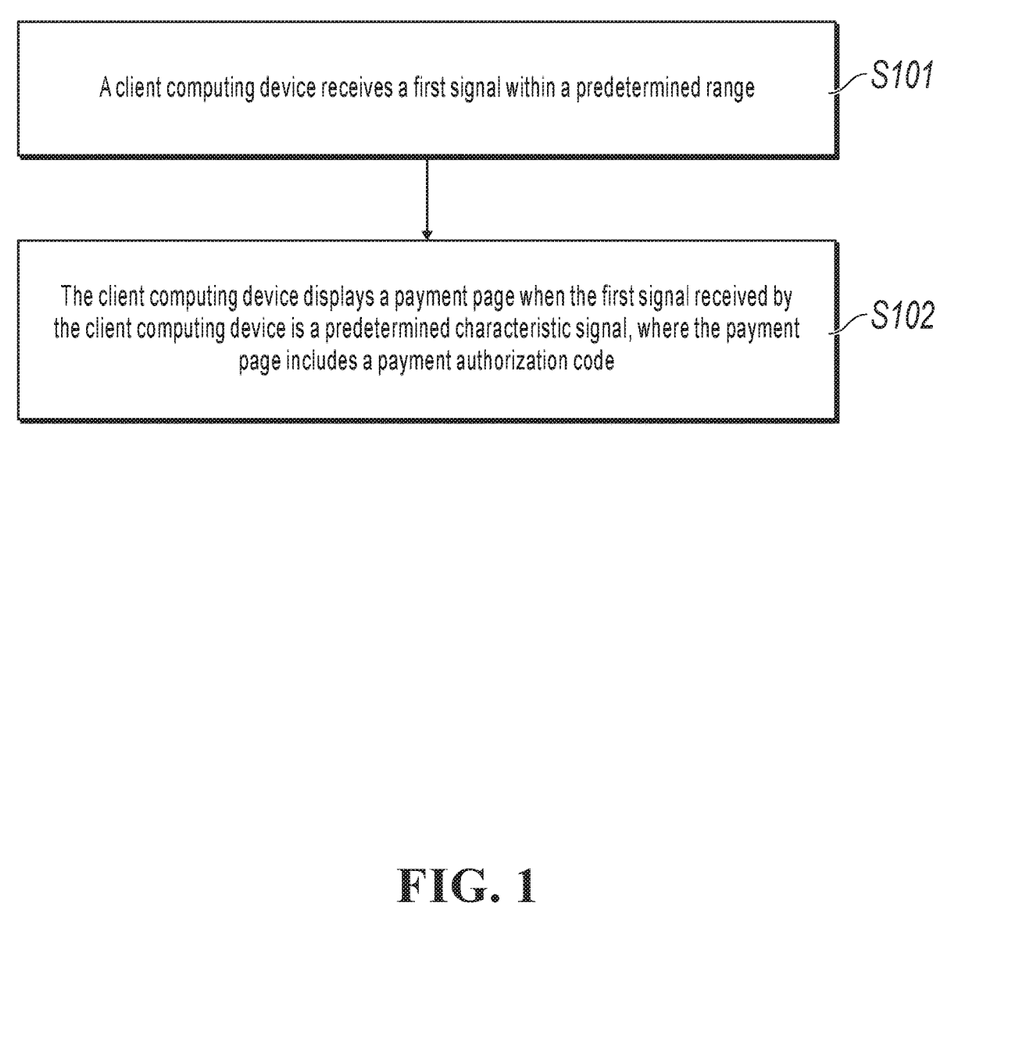
FIG. 1 is a flowchart illustrating an implementation of a method for displaying a payment page, according to the present application.

The present application provides an implementation of a method for displaying a payment page. FIG. 1 is a flowchart illustrating an implementation of the method for displaying a payment page, according to the present application. Referring to FIG. 1, the method for displaying a payment page can include the following steps.

S101: A client computing device receives a first signal within a predetermined range.

The client computing device can be an electronic device that has a signal receiving function. The client computing device can be an electronic device equipped with a signal receiving apparatus, for example, can be an electronic device that has a photosensitive sensor or an acoustic wave sensor.

The client computing device can receive the first signal within the predetermined range. The first signal can include an optical wave signal or an acoustic wave signal.

Figure 2:
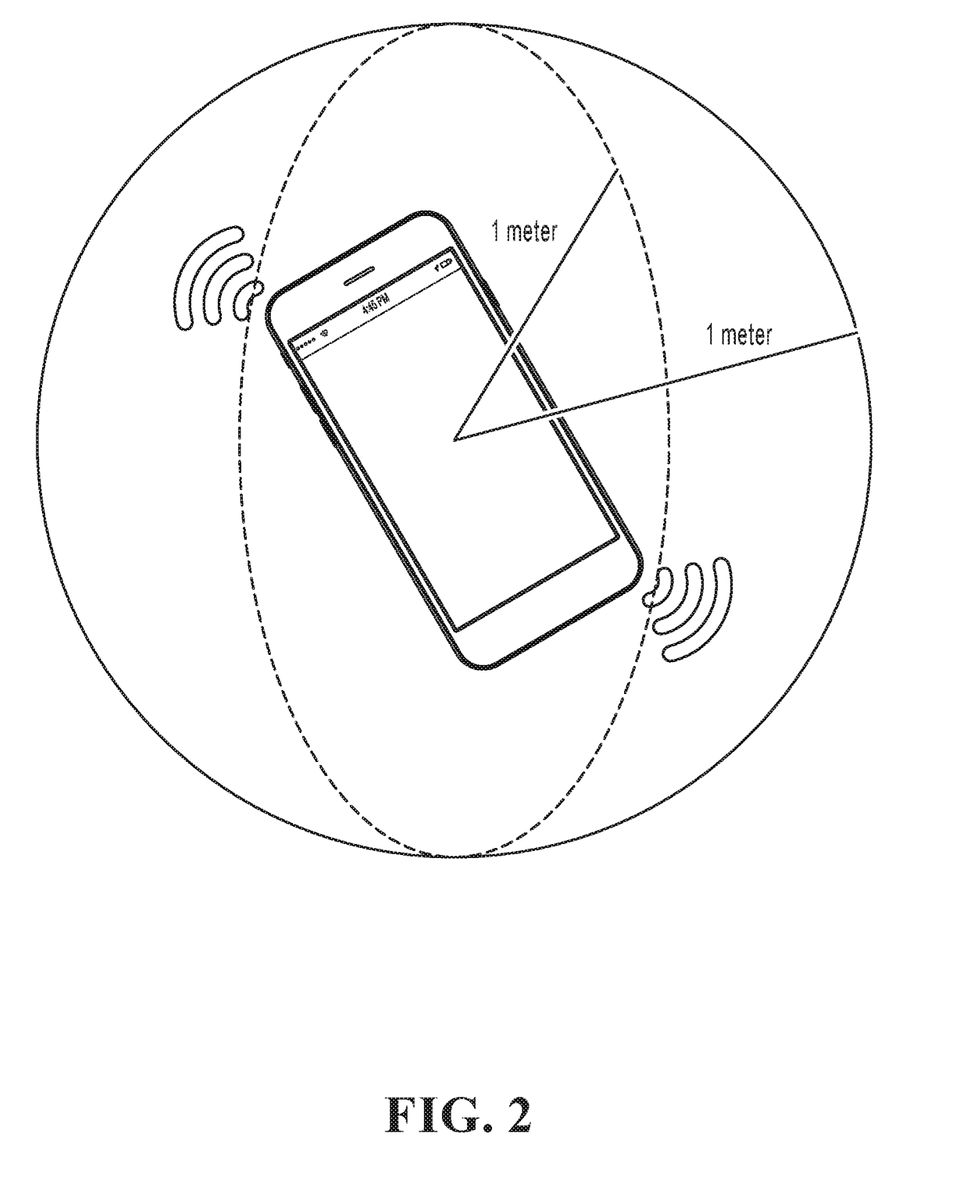
FIG. 2 is a schematic diagram illustrating a predetermined range within which a client computing device receives a first signal, according to an implementation of the present application.

In an implementation, the predetermined range can be a range formed by using the client computing device as a center and using a predetermined distance as a radius. The predetermined distance can be 0 to 1 meter. For example, FIG. 2 is a schematic diagram illustrating a predetermined range within which a client computing device receives a first signal, according to an implementation of the present application. Referring to FIG. 2, if the client computing device is a client computing device that can receive an acoustic wave signal, the predetermined range can be a spherical range formed by using the client computing device as a center and having a radius of 1 meter.

Figure 3:
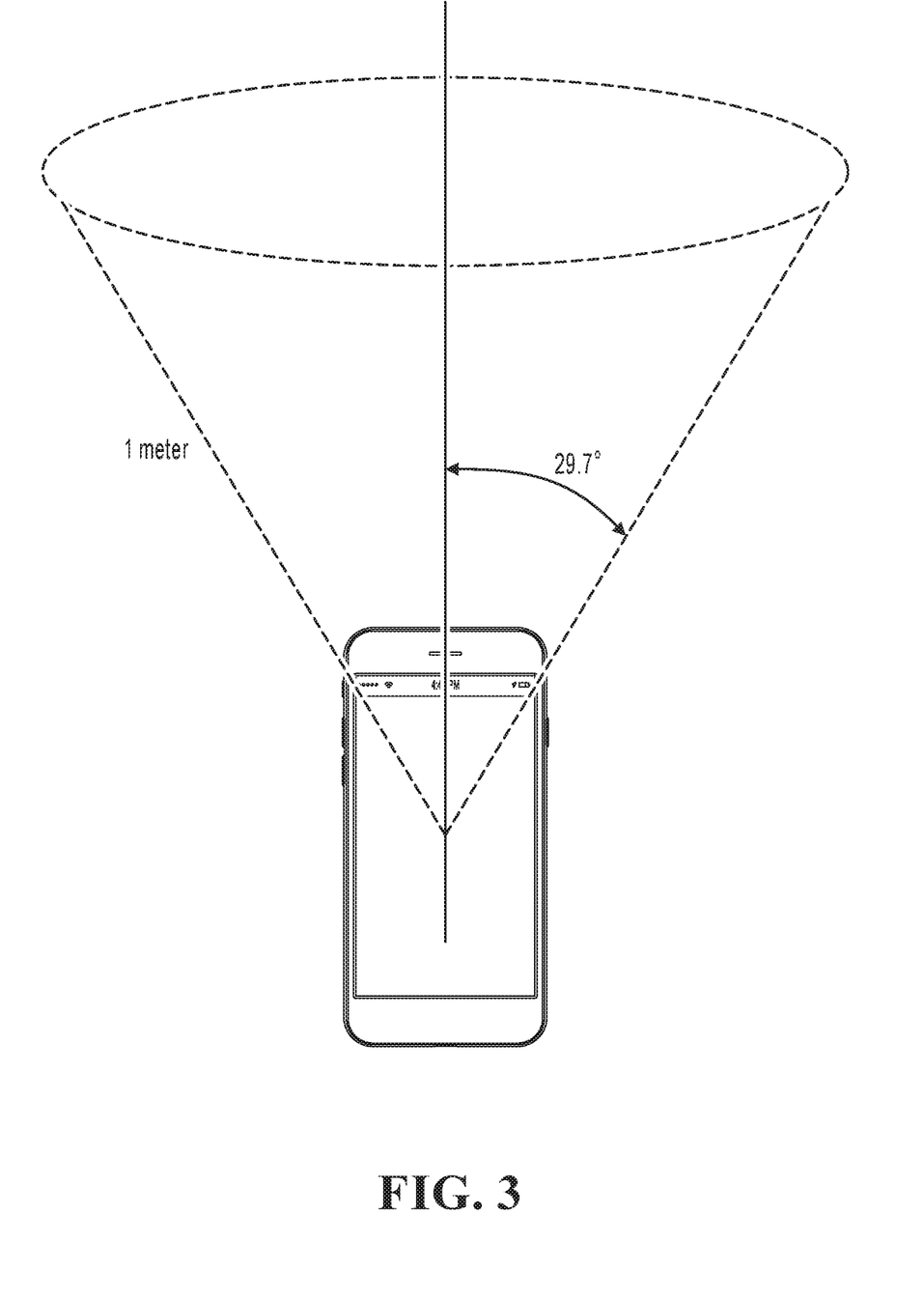
FIG. 3 is another schematic diagram illustrating a predetermined range within which a client computing device receives a first signal, according to an implementation of the present application.

In another implementation, alternatively, the predetermined range can be a range formed by using a direction perpendicular to a display screen of the client computing device as an axis, using an angle between another direction and the axis as a predetermined angle, and using a distance from the client computing device to the display screen as a predetermined distance. The predetermined angle can be 10 to 90 degrees. FIG. 3 is another schematic diagram illustrating a predetermined range within which a client computing device receives a first signal, according to an implementation of the present application. Referring to FIG. 3, if the client computing device is an electronic device that can receive an optical wave signal, the predetermined range can be a conical range formed by using a direction perpendicular to a display screen of the client computing device as a direction of an axis, using an angle of 29.7 degrees between another direction and the axis, and using a distance of 1 meter from the client computing device.

The range within which the client computing device receives the signal is set, so that it can be ensured that the client computing device receives a signal only within a relatively small range, and interference from another signal to the received signal can be prevented.

S102. The client computing device displays a payment page when the first signal received by the client computing device is a predetermined characteristic signal.

The payment page can include a payment authorization code.

The predetermined characteristic signal can be a signal sent by an electronic device of a payee, for example, can be a signal sent by a code scanner. The predetermined characteristic signal can be used to indicate a request for obtaining a user authorization code.

The predetermined characteristic signal can be an optical wave signal with a predetermined wavelength or an acoustic wave signal with a predetermined frequency. For example, the predetermined characteristic signal can be an infrared optical wave signal with a wavelength of 760 nanometers (nm) to 1 millimeter (mm), or the predetermined characteristic signal can be an acoustic wave signal with a frequency of 16 kilohertz to 18 kilohertz (kHz).

When the first signal received by the client computing device is a predetermined characteristic signal, it can indicate that the signal received by the client computing device is a request sent by the payee for obtaining the payment authorization code. The client computing device can display the payment page. The payment page can include the payment authorization code associated with a user.

In an application scenario, the predetermined characteristic signal can be an infrared optical wave signal with a wavelength of 820 nm, and a signal that can be received by the client computing device is an optical wave signal. A predetermined range within which the client computing device receives the optical wave signal can be a conical range formed by using a direction perpendicular to the display screen of the client computing device as a direction of an axis, using an angle of 45 degrees between another direction and the axis, and using a distance of 1 meter from the client computing device. The client computing device can receive the optical wave signal within the predetermined range, and determine whether the received optical wave signal is an infrared optical wave signal with a wavelength of 820 nm. If a result of the determination is no, the client computing device can ignore the optical wave signal. If a result of the determination is yes, it indicates that the received optical wave signal is a request sent by the payee for obtaining the user authorization code. In this case, the client computing device displays the payment page that has the user authorization code. For example, the user can orient a screen of a mobile phone to the electronic device of the payee to ensure that an optical wave signal sent by the electronic device of the payee can be accurately received. After receiving the optical wave signal sent by the electronic device of the payee, the mobile phone of the user automatically displays a payment page to the electronic device of the payee for scanning. In this process, the user only needs to orient the screen of the mobile phone to the electronic device of the payee, and no other operation is needed. As such, a case that the user cannot correctly tap a "Payment" button on an initial page of an electronic payment application program can be avoided, and the electronic payment efficiency can be improved.

In another application scenario, the predetermined characteristic signal can be an acoustic wave signal with a frequency of 18 kHz, and a signal that can be received by the client computing device is an acoustic wave signal. A predetermined range within which the client computing device receives the acoustic wave signal can be a conical range formed by using a direction perpendicular to the display screen of the client computing device as a direction of an axis, using an angle of 45 degrees between another direction and the axis, and using a distance of 1 meter from the client computing device. The client computing device can receive the acoustic wave signal within the predetermined range, and determine whether the received acoustic wave signal is an acoustic wave signal with a frequency of 18 kHz. If a result of the determination is no, the client computing device can ignore the acoustic wave signal. If a result of the determination is yes, it indicates that the received acoustic wave signal is a request sent by the payee for obtaining the user authorization code. In this case, the client computing device displays the payment page that has the user authorization code. For example, the user can place a mobile phone near the electronic device of the payee to ensure that an acoustic wave signal sent by the electronic device of the payee can be accurately received. The mobile phone of the user can automatically display a payment page after receiving the acoustic wave signal sent by the electronic device of the payee, and the user can provide the displayed payment page for the electronic device of the payee for scanning. In this process, the user only needs to place the mobile phone near the electronic device of the payee, and provide the displayed payment page for the payee, and no other operation is needed. As such, a case that the user cannot correctly tap a "Payment" button on an initial page of an electronic payment application program can be avoided, and the electronic payment efficiency can be improved.

According to the method for displaying a payment page that is provided in the previous implementation, based on the signal received by the client computing device, it can be determined whether the signal received by the client computing device is the predetermined characteristic signal sent by the payee for indicating the request for obtaining the user authorization code. When the result of the determination is yes, the client computing device displays the payment page that includes the user authorization code to a payer for scanning, to complete the electronic payment process. The electronic payment process is very convenient, so that the speed and efficiency of the electronic payment can be improved.

Figure 4:
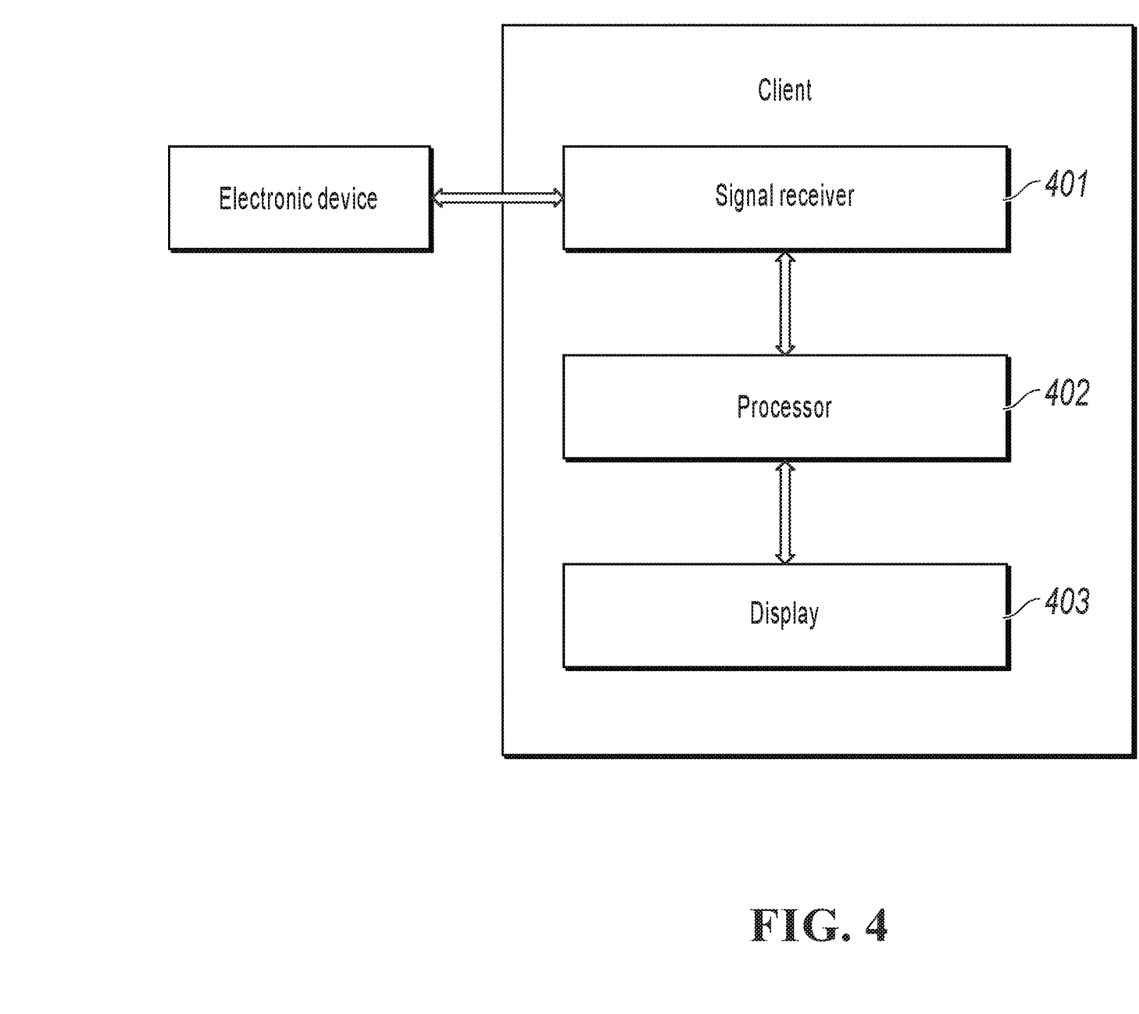
FIG. 4 is a schematic composition diagram illustrating an implementation of a client computing device, according to the present application.

The present application further provides an implementation of a client computing device. The client computing device can be configured to display a payment page. FIG. 4 is a schematic composition diagram illustrating an implementation of a client computing device, according to the present application. Referring to FIG. 4, the client computing device can include a signal receiver 401, a processor 402, and a display 403.

The signal receiver 401 can be configured to receive a signal within a predetermined range.

In an implementation, the signal receiver 401 can include a photosensitive sensor and/or an acoustic wave sensor.

The client computing device can receive an optical wave signal when the signal receiver 401 includes a photosensitive sensor. The client computing device can receive an acoustic wave signal when the signal receiver 401 includes an acoustic wave sensor.

The display 403 can be configured to display page data, for example, can be configured to display a payment page that includes a user authorization code.

In an implementation, the display 403 can be a display tool that displays an electronic file on a screen by using a particular transmission device and then reflects the electronic file to human's eyes. The display 403 can be a cathode ray tube (CRT) display, a plasma display (PDP), a liquid crystal display (LCD), etc.

The processor 402 can be configured to determine whether the signal received by the signal receiver is a predetermined characteristic signal, and the processor can be further configured to control the display to display a payment page if a result of the determination is yes.

In an implementation, the processor 402 can be implemented based on any suitable method. For example, the processor 402 can be a microprocessor or a processor and a computer readable medium storing computer readable program code (such as software or firmware) that can be executed by the microprocessor or the processor, a logic gate, a switch, an application-specific integrated circuit (ASIC), a programmable logic controller, or a built-in microcontroller. Forms are not limited in the present application.

In an implementation, when the signal receiver 401 includes a photosensitive sensor, a photosensitive surface of the photosensitive sensor is on the same plane as a screen of the display 403 of the client computing device. In this case, the user can directly orient the screen of the client computing device to a payee, and after the client computing device receives the optical wave signal, the displayed payment page can be directly provided for the payee for scanning. As such, the convenience and efficiency of a user's payment operation can be improved.

A function performed by the client computing device provided in the previous implementation can be explained with reference to the method implementation of the present application, can implement the method implementation of the present application, and can achieve technical effects of the method implementation.

Figure 5:
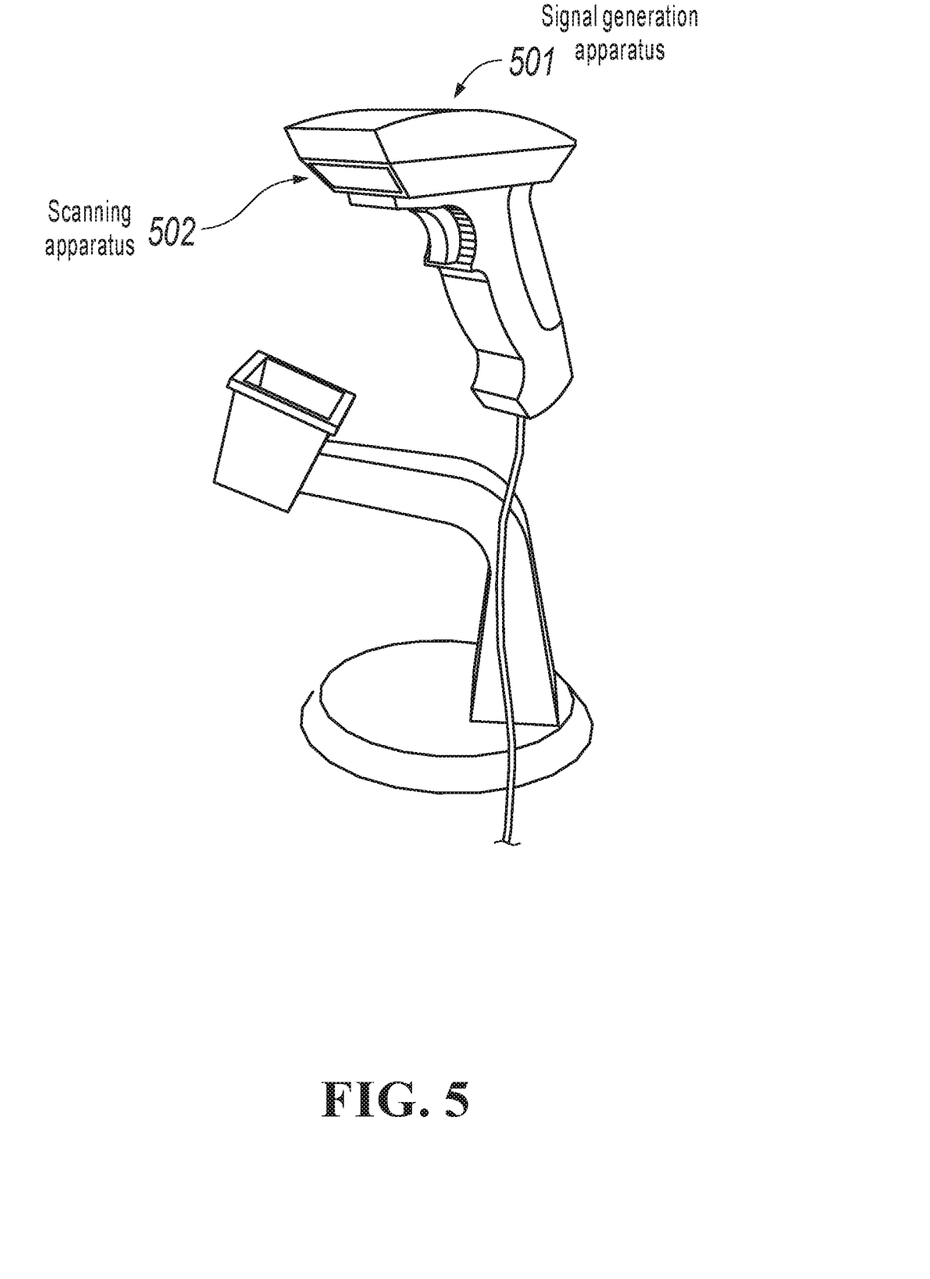
FIG. 5 is a schematic composition diagram illustrating an implementation of an electronic device, according to the present application.

The present application further provides an implementation of an electronic device. The electronic device can be applied to a payee. FIG. 5 is a schematic composition diagram illustrating an implementation of an electronic device, according to the present application. Referring to FIG. 5, the electronic device can include a signal generation apparatus 501 and a scanning apparatus 502.

The signal generation apparatus 501 can be configured to send a predetermined characteristic signal.

In an implementation, the signal generation apparatus 501 can include an acoustic wave generation apparatus and/or an optical wave generator.

The scanning apparatus 502 can be configured to scan a payment page of a client computing device to obtain a user authorization code of the client computing device.

In an implementation, the scanning apparatus 502 can include a bar code scanning apparatus, a two-dimensional code scanning apparatus, and/or a character code scanning apparatus.

In an implementation, the scanning apparatus 502 can continuously send a scanning signal. For example, after the electronic device is powered on, the scanning apparatus 502 can continuously send a scanning signal.

In another implementation, alternatively, the scanning apparatus 502 can send a scanning signal after the signal generation apparatus 501 sends the predetermined characteristic signal for a predetermined time interval. The predetermined time interval can be set to 1 to 3 seconds. For example, the scanning apparatus 502 can send a scanning signal after the signal generation apparatus 501 sends the predetermined characteristic signal for 1 second. In the present implementation, it can be ensured that the payment page can be scanned in time after the client computing device displays the payment page, or scanning may not be enabled before the signal generation apparatus sends the predetermined characteristic signal, to save energy.

In an implementation, when the signal generation apparatus 501 includes an optical wave generator, a direction in which the optical wave generator sends an optical wave signal can be the same as a direction in which the scanning apparatus 502 sends a scanning signal. In this case, an operation of sending a request for obtaining the user authorization code and an operation of obtaining the user authorization code displayed on the user's client computing device can be completed successively provided that the user who uses the electronic device orients a direction of sending the signal to a direction of a display screen of the user's client computing device. The payment process is very convenient, so that the electronic payment speed and the payment efficiency can be improved.

The electronic device provided in the previous implementation is used in co-operation with the implementation of the client computing device in the present application, the electronic device can request to obtain the user authorization code from the client computing device by sending the predetermined characteristic signal; the client computing device can display the payment page that includes the user authorization code after receiving the predetermined characteristic signal sent by the electronic device; and the scanning apparatus of the electronic device can obtain the user authorization code in the payment page by sending the scanning signal for electronic payment. The electronic payment process is very convenient, so that the speed and efficiency of the electronic payment can be improved.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor and a computer readable medium storing computer readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory.

A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function.

For ease of description, the apparatus above is described by dividing functions into various units. Certainly, when the present application is implemented, the functions of the units can be implemented in one or more pieces of software and/or hardware.

It can be seen from the descriptions of the implementations that a person skilled in the art can clearly understand that the present application can be implemented by using software and a necessary general hardware platform. Based on such an understanding, the technical solutions in the present application essentially or the part contributing to the existing technology may be implemented in a form of a software product. In a typical configuration, a computing device includes one or more processors (CPU), one or more input/output interfaces, one or more network interfaces, and one or more memories. The computer software product can include several instructions for instructing a computer device (which can be a personal computer, a server, a network device, etc.) to perform the methods described in the implementations of the present application or some parts of the implementations. The computer software product can be stored in the memory, and the memory can include a non-permanent memory, a random access memory (RAM) and/or a non-volatile memory in a computer readable medium, for example, a read-only memory (ROM) or a flash memory (flash RAM). The memory is an example of the computer readable medium. The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be used to store information accessible by the computing device. Based on the description in the present specification, the computer readable medium does not include transitory computer readable media (transitory media), such as a modulated data signal and carrier.

The implementations in the present specification are described in a progressive way. For the same or similar parts of the implementations, references can be made to the implementations. Each implementation focuses on a difference from other implementations. Particularly, a system implementation is basically similar to a method implementation, and therefore is described briefly. For related parts, references can be made to related descriptions in the method implementation.

The present application can be applied to many general-purpose or dedicated computer system environments or configurations, for example, a personal computer, a server computer, a handheld device or a portable device, a flat panel device, a multi-processor system, a microprocessor-based system, a set-top box, a programmable consumption electronic device, a network PC, a minicomputer, a mainframe computer, and a distributed computing environment including any one of the previous systems or devices.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

Although the present application is described by using the implementations, a person of ordinary skill in the art knows that many modifications and variations of the present application can be made without departing from the spirit of the present application. It is expected that the claims include these modifications and variations without departing from the spirit of the present application.

Figure 6:
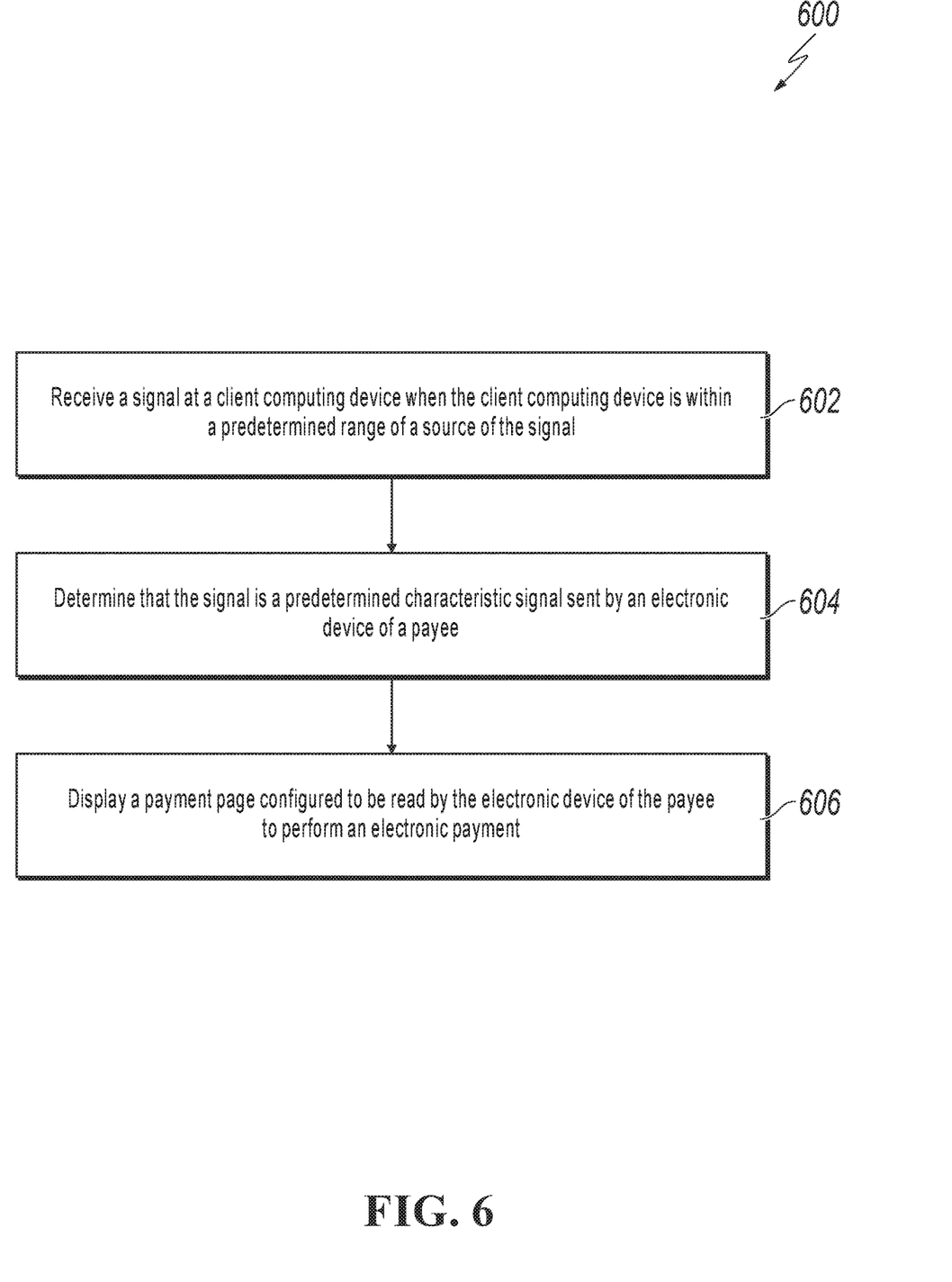
FIG. 6 is a flowchart illustrating an example of a computer-implemented method for displaying a payment page, according to an implementation of the present disclosure.

FIG. 6 is a flowchart illustrating an example of a computer-implemented method 600 for displaying a payment page, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a signal is received at a client computing device is received when the client computing device is within a predetermined range of a source of the signal. In some implementations, the predetermined range is formed by using the client computing device as a center and using a predetermined distance as a radius, and where the predetermined distance is ranged from 0 to 1 meter.

In some implementations, the predetermined range is formed by using a direction perpendicular to a display screen of the client computing device as an axis, using an angle between another direction and the axis as a predetermined angle, and using a distance from the client computing device to the display screen as a predetermined distance, and where the predetermined angle is ranged from 10 to 90 degrees. From 602, method 600 proceeds to 604.

At 604, the signal is determined to be a predetermined characteristic signal sent by an electronic device of a payee. In some implementations, the predetermined characteristic signal is sent from an electronic device associated with a payee. In some implementations, the predetermined characteristic signal is an optical wave signal with a predetermined wavelength. In some implementations, the predetermined characteristic signal is an acoustic wave signal with a predetermined frequency. From 604, method 600 proceeds to 606.

At 606, a payment page is displayed by the client computing device if it is determined that the received signal is the predetermined characteristic signal. In some cases, the payment page includes a Quick Response (QR) code associated with the electronic payment. In some implementations, the electronic device associated with the payee can scan the QR code (e.g., using a camera or other light sensing component), extract details of the electronic payment encoded in the QR code, and perform the electronic payment.

In some implementations, the method 600 includes determining that the signal is a request sent from a payee for obtaining a payment authorization code, wherein the payment page that includes the payment authorization code associated with a user of the client computing device In some cases, the signal is a first signal, and the method 600 includes receiving, at the client computing device, a second signal when the client computing device is within the predetermined range of a source of the second signal; determining, by the client computing device, that the second signal is not the predetermined characteristic signal; and in response to determining that the second signal is not the predetermined characteristic signal, ignoring, by the client computing device, the second signal. After 606, method 600 stops.

Implementations of the present application can solve technical problems in displaying payment page in electronic devices. Traditionally, a payment page can be displayed on a user's electronic device when the user opens a payment application program and interacts with an initial page, such as by tapping a "Payment" button. However, such a method is time consuming, and can lead to long wait times when many people are waiting to make payments. The techniques described in this specification allow a payment page to be automatically displayed based on the user's proximity to a device ready to receive a payment. As a result, the payment process is streamlined and takes less time, which can lead to greater user satisfaction and greater transaction throughput for the payee operating the payment device.

Implementation of the present application provide methods and apparatuses for improving payment page display on an electronic device. According to these implementations, based on the signal received by the client computing device, it can be determined whether the signal received by the client computing device is the predetermined characteristic signal sent by the payee for indicating the request for obtaining the user authorization code. When the result of the determination is yes, the client computing device displays the payment page that includes the user authorization code to a payer for scanning, to complete the electronic payment process. The electronic payment process is very convenient, so that the speed and efficiency of the electronic payment can be improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
receiving, at a client computing device of a user, a signal sent by a first electronic device of a payee for an electronic payment, wherein the signal is an acoustic signal or an optical signal;
in response to receiving the signal, determining, by the client computing device, that the first electronic device is within a predetermined range of the client computing device;
analyzing, by the client computing device, the signal to determine that the signal includes a predetermined characteristic, wherein the predetermined characteristic is a predetermined frequency of the acoustic signal or a predetermined wavelength of the optical signal;
determining, by the client computing device, that the signal includes the predetermined characteristic; and
in response to determining that 1) the first electronic device is within the predetermined range of the client computing device, and 2) the signal includes the predetermined characteristic, displaying, by the client computing device, a payment page configured to be read by the first electronic device of the payee to perform the electronic payment.

2. The computer-implemented method of claim 1, wherein the predetermined range is formed by using the client computing device as a center and using a predetermined distance as a radius, and wherein the predetermined distance has a range from 0 to 1 meter.

3. The computer-implemented method of claim 1, wherein the predetermined range comprises (i) an angular range around a normal to a surface of a display screen, the angular range represented by an angle between the normal to the surface of the display screen and a line intersecting the normal at the surface, wherein the angle is between 10 and 90 degrees, and (ii) a predetermined distance from the display screen.

4. The computer-implemented method of claim 1, wherein the signal is a first signal, and the method further comprises:
receiving, at the client computing device, a second signal sent by a second electronic device that is different from the first electronic device;
determining, by the client computing device, that the second electronic device is within the predetermined range of the client computing device;
determining, by the client computing device, that the second signal does not include the predetermined frequency of the acoustic signal or the predetermined wavelength of the optical signal; and
in response to determining that the second signal does not include the predetermined characteristic, ignoring, by the client computing device, the second signal.

5. The computer-implemented method of claim 1, further comprising:
determining that the signal is a request sent from a payee for obtaining a payment authorization code, wherein the payment page includes the payment authorization code associated with a user of the client computing device.

6. The computer-implemented method of claim 1, wherein the payment page includes a Quick Response (QR) code associated with the electronic payment.

7. A non-transitory, computer-readable medium storing one or more instructions executable by a computer system to perform operations for displaying a payment page, the operations comprising:
receiving, at a client computing device of a user, a signal sent by a first electronic device of a payee for an electronic payment, wherein the signal is an acoustic signal or an optical signal;
in response to receiving the signal, determining, by the client computing device, that the first electronic device is within a predetermined range of the client computing device;
analyzing, by the client computing device, the signal to determine that the signal includes a predetermined characteristic, wherein the predetermined characteristic is a predetermined frequency of the acoustic signal or a predetermined wavelength of the optical signal;
determining, by the client computing device, that the signal includes the predetermined characteristic; and
in response to determining that 1) the first electronic device is within the predetermined range of the client computing device, and 2) the signal includes the predetermined characteristic, displaying, by the client computing device, a payment page configured to be read by the first electronic device of the payee to perform the electronic payment.

8. The non-transitory, computer-readable medium of claim 7, wherein the predetermined range is formed by using the client computing device as a center and using a predetermined distance as a radius, and wherein the predetermined distance has a range from 0 to 1 meter.

9. The non-transitory, computer-readable medium of claim 7, wherein the predetermined range comprises (i) an angular range around a normal to a surface of a display screen, the angular range represented by an angle between the normal to the surface of the display screen and a line intersecting the normal at the surface, wherein the angle is between 10 and 90 degrees, and (ii) a predetermined distance from the display screen.

10. The non-transitory, computer-readable medium of claim 7, wherein the signal is a first signal, and the operations further comprise:
receiving, at the client computing device, a second signal sent by a second electronic device that is different from the first electronic device;
determining, by the client computing device, that the second electronic device is within the predetermined range of the client computing device;
determining, by the client computing device, that the second signal does not include the predetermined frequency of the acoustic signal or the predetermined wavelength of the optical signal; and
in response to determining that the second signal does not include the predetermined characteristics, ignoring, by the client computing device, the second signal.

11. The non-transitory, computer-readable medium of claim 7, the operations further comprising:
determining that the signal is a request sent from a payee for obtaining a payment authorization code, wherein the payment page includes the payment authorization code associated with a user of the client computing device.

12. The non-transitory, computer-readable medium of claim 7, wherein the payment page includes a Quick Response (QR) code associated with the electronic payment.

13. A computer-implemented system for displaying a payment page, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a client computing device of a user, a signal sent by a first electronic device of a payee for an electronic payment, wherein the signal is an acoustic signal or an optical signal;
in response to receiving the signal, determining, by the client computing device, that the first electronic device is within a predetermined range of the client computing device;
analyzing, by the client computing device, the signal to determine that the signal includes a predetermined characteristic, wherein the predetermined characteristic is a predetermined frequency of the acoustic signal or a predetermined wavelength of the optical signal;
determining, by the client computing device, that the signal includes the predetermined characteristic; and
in response to determining that 1) the first electronic device is within the predetermined range of the client computing device, and 2) the signal includes the predetermined characteristic displaying, by the client computing device, a payment page configured to be read by the first electronic device of the payee to perform the electronic payment.

14. The computer-implemented system of claim 13, wherein the predetermined range is formed by using the client computing device as a center and using a predetermined distance as a radius, and wherein the predetermined distance has a range from 0 to 1 meter.

15. The computer-implemented system of claim 13, wherein the predetermined range comprises (i) an angular range around a normal to a surface of a display screen, the angular range represented by an angle between the normal to the surface of the display screen and a direction represented by a line intersecting the normal on at the surface, wherein the angle is between 10 and 90 degrees, and (ii) a distance from the client computing device to the display screen as a predetermined distance from the display screen, and wherein the angle is 10 and 90 degrees.

* * * * *